(12) United States Patent
Taber

(10) Patent No.: US 8,733,285 B2
(45) Date of Patent: May 27, 2014

(54) BIRD-OPERATED INTERACTIVE BIRD FEEDER HAVING FEED ACTIVATION TOOL

(76) Inventor: Robert Wesley Taber, Dayville, CT (US)

( * ) Notice: Subject to any disclaimer, the term of this patent is extended or adjusted under 35 U.S.C. 154(b) by 2 days.

(21) Appl. No.: 13/451,441

(22) Filed: Apr. 19, 2012

(65) Prior Publication Data

US 2013/0276710 A1      Oct. 24, 2013

(51) Int. Cl.
  *A01K 39/01*       (2006.01)
(52) U.S. Cl.
  USPC ............................................. 119/57.8; 119/70
(58) Field of Classification Search
  USPC ........................ 119/429, 52.2, 57.8, 57.91, 70
  See application file for complete search history.

(56) References Cited

U.S. PATENT DOCUMENTS

| 6,578,517 | B2 | 6/2003 | Borries |
| 7,861,671 | B2 | 1/2011 | Carter et al. |

FOREIGN PATENT DOCUMENTS

GB         1404363 A   *   8/1975

* cited by examiner

*Primary Examiner* — Rob Swiatek
*Assistant Examiner* — Kathryn L Thompson
(74) *Attorney, Agent, or Firm* — Matthew J. Esserman

(57) ABSTRACT

A bird-operated interactive bird feeder is provided. The interactive bird feeder attracts birds and dispenses a substantially predetermined amount of bird feed (e.g. bird seed) when a bird operates a tool. Bird feed is held in storage in a feed hopper (i.e. housing) above a stage. An aperture is provided in the bottom of the housing large enough for the enclosed feed to flow freely from the housing to the stage. However, the aperture is equipped with the tool that causes the feed to bridge. When a bird operates the tool, the tool disrupts the bridged feed causing feed flow for a period of time, and then rebuilds the feed bridge when the bird ceases operation of the tool. Avid bird watchers can therefore enjoy watching birds for extended periods of time since the birds encounter larger amounts of feed at the stage.

22 Claims, 3 Drawing Sheets

BIRD-OPERATED INTERACTIVE BIRD FEEDER HAVING FEED ACTIVATION TOOL

FIELD OF THE INVENTION

The present invention relates generally to the field of bird feeders, and, more specifically, to bird-operated interactive bird feeders comprising a feed activation tool.

BACKGROUND OF THE INVENTION

Typical bird feeders enable birds to directly grab feed such as seed one-at-a-time stored from within a seed hopper (or housing). However, a drawback for this direct, single-serve configuration is that birds tend to leave the feeding area (or stage) soon after obtaining a single seed. This quick retreat by the birds often disappoints avid bird watchers who enjoy the ability to view birds for extended periods of time.

Thus, it is desirable to provide a bird-operated interactive bird feeder which is able to overcome the above disadvantages.

A goal of this invention is to persuade birds to remain at the staging area for longer periods of time. This is accomplished using the bird-operated interactive bird feeder as per the present invention.

Therefore, a need exists to provide a bird-operated interactive bird feeder that allows for maintaining birds at the staging area for extended time periods, via utilization of a feed activation tool. The tool is designed to be interacted with by birds to thereby allow preferably more than one seed to be released from the housing at a time thus increasing enjoyment of the bird watchers by maintaining the birds at the stage for longer time periods.

These and other advantages of the present invention will become more fully apparent from the detailed description of the invention hereinbelow.

SUMMARY OF THE INVENTION

The present invention is directed to a bird-operated interactive bird feeder comprising a housing that stores bird feed, wherein the housing comprises a bottom, and wherein the bottom includes an aperture. The bird feeder also comprises a tool, wherein at least a portion of the tool is positioned within the housing and in the vicinity of the aperture, wherein the tool is movable from a first position to a second position, and wherein the tool is capable of moving from the first position to the second position when a bird exerts a force on the tool. The at least a portion of the tool bridges the feed thereby restricting the bird feed from passing through the aperture when the tool is in the first position, and wherein the at least a portion of the tool disrupts the bridged feed thereby allowing the bird feed to pass through the aperture when the tool is in the second position.

In one embodiment, the bird feeder may further comprise an attachment device that is secured to the tool, wherein the attachment device is at least partly exterior to the housing, and wherein the bird exerts an indirect force on the tool via the attachment device. An attractant (e.g. seed(s), leather piece, and/or worm) may be secured to the attachment device such that the bird interacts with the attractant thereby providing the indirect force on the tool via the attachment device. The attachment device may be, for example, a safety pin, a bird swing, or a perch.

In an alternative embodiment, the tool may extend through the aperture such that the tool is partly exterior to the housing. An attractant (e.g. seed(s), leather piece, and/or worm) may be secured to the tool such that the bird interacts with the attractant thereby providing a direct force on the tool. The tool may comprise, for example, a safety pin type latching mechanism, a bird swing, or a perch.

In another alternative embodiment, the attractant may be secured to the tool such that the bird interacts with the attractant thereby providing a direct force on the tool, and wherein the attractant is at least partly exterior to the housing.

The bird feed that is allowed to pass through the aperture preferably comprises more than one piece of bird feed.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
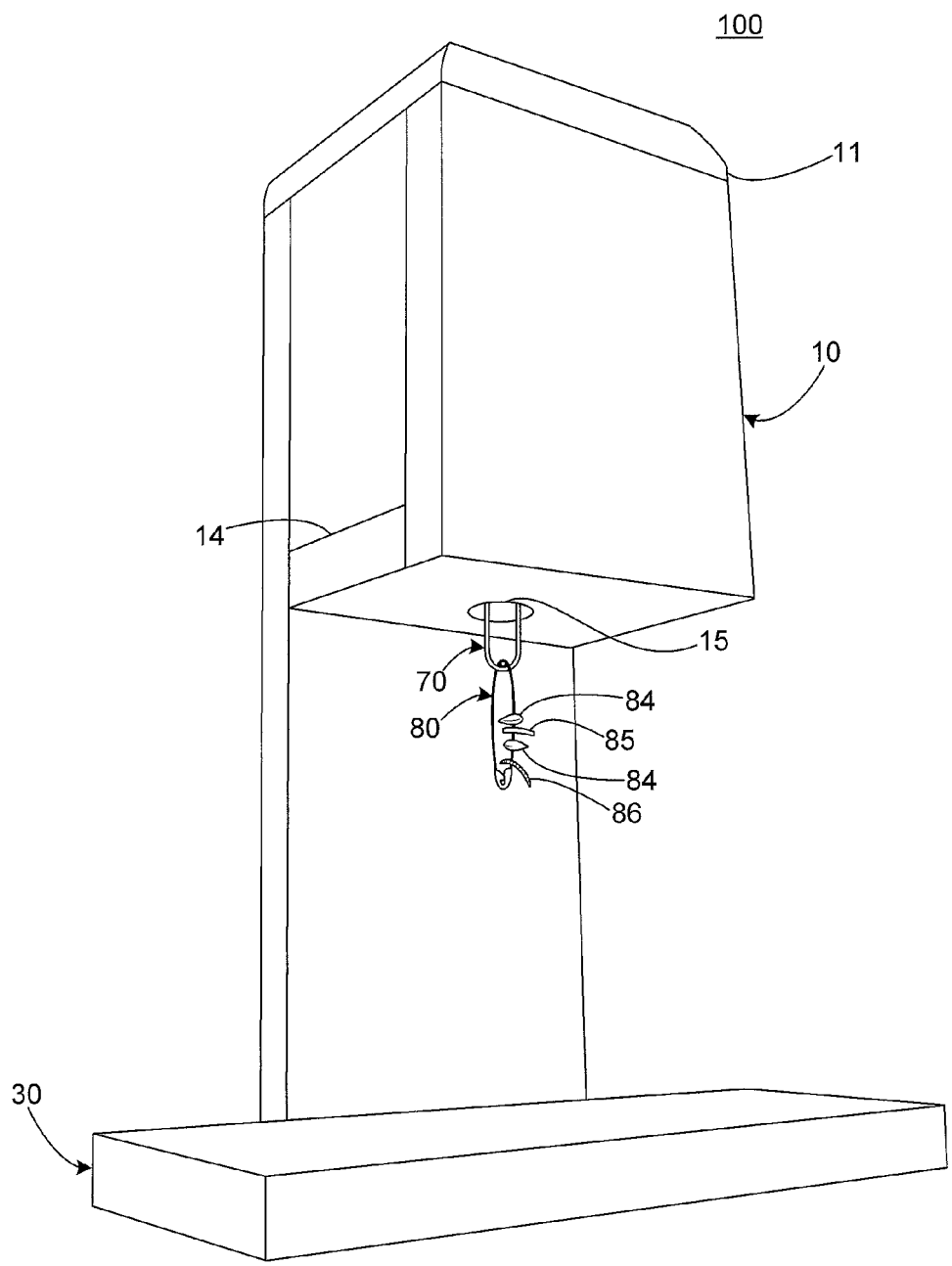
FIG. 1 is a lower perspective view of a bird-operated interactive bird feeder that includes a housing, tool, attachment device, and attractants, in accordance with a preferred embodiment of the present invention.

It is to be understood that the figures and descriptions of the present invention may have been simplified to illustrate elements that are relevant for a clear understanding of the present invention, while eliminating, for purposes of clarity, other elements found in a typical bird feeder. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

FIG. 1 is a lower perspective view of a bird-operated interactive bird feeder 100 that includes a housing 10, tool 70, attachment device 80, and attractants (e.g. seeds 84, leather piece 85, and worm 86), in accordance with a preferred embodiment of the present invention.

Figure 2:
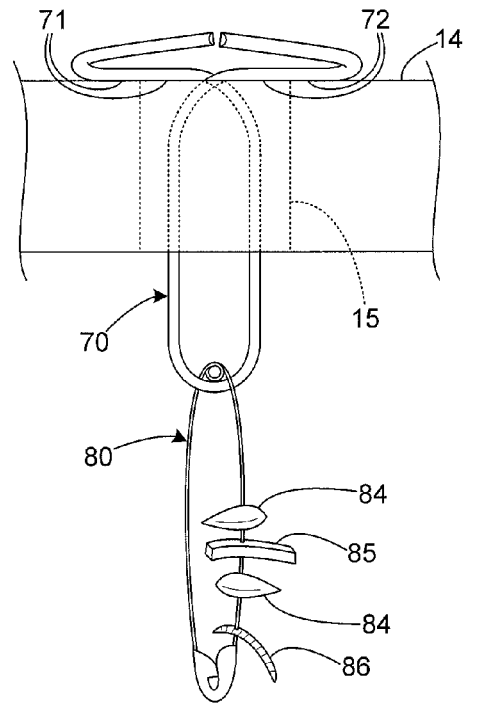
FIG. 2 is an enlarged, cross-sectional side view of the housing's bottom, tool, attachment device (e.g. in the form of a safety pin), and attractants (e.g. seeds, leather piece, and worm) shown in FIG. 1.

FIG. 2 is an enlarged, cross-sectional side view of a portion of the housing's bottom 14, tool 70, attachment device 80 (e.g. in the form of a safety pin 80), and attractants (e.g. seeds 84, leather piece 85, and worm 86) shown in FIG. 1.

Figure 3:
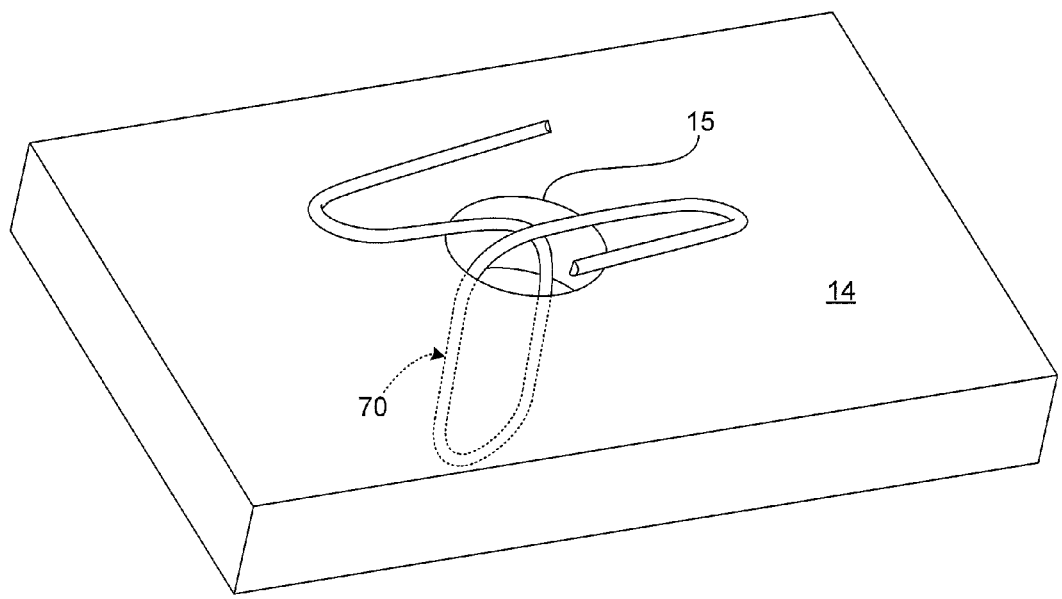
FIG. 3 is an elevated perspective view of the housing's bottom and tool shown in FIGS. 1 and 2.

FIG. 3 is an elevated perspective interior view of the housing's bottom 14 and tool 70 shown in FIGS. 1 and 2.

Figure 4:
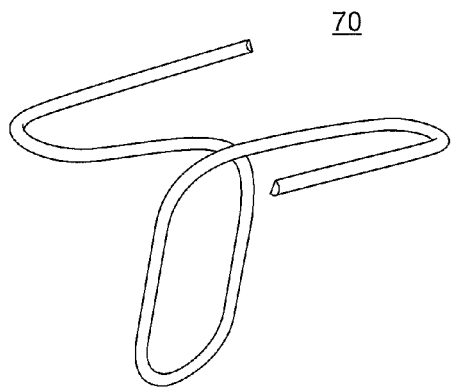
FIG. 4 is an elevated perspective view of the tool shown in FIGS. 1-3.

FIG. 4 is an elevated perspective view of the tool 70 shown in FIGS. 1-3.

Figure 5:
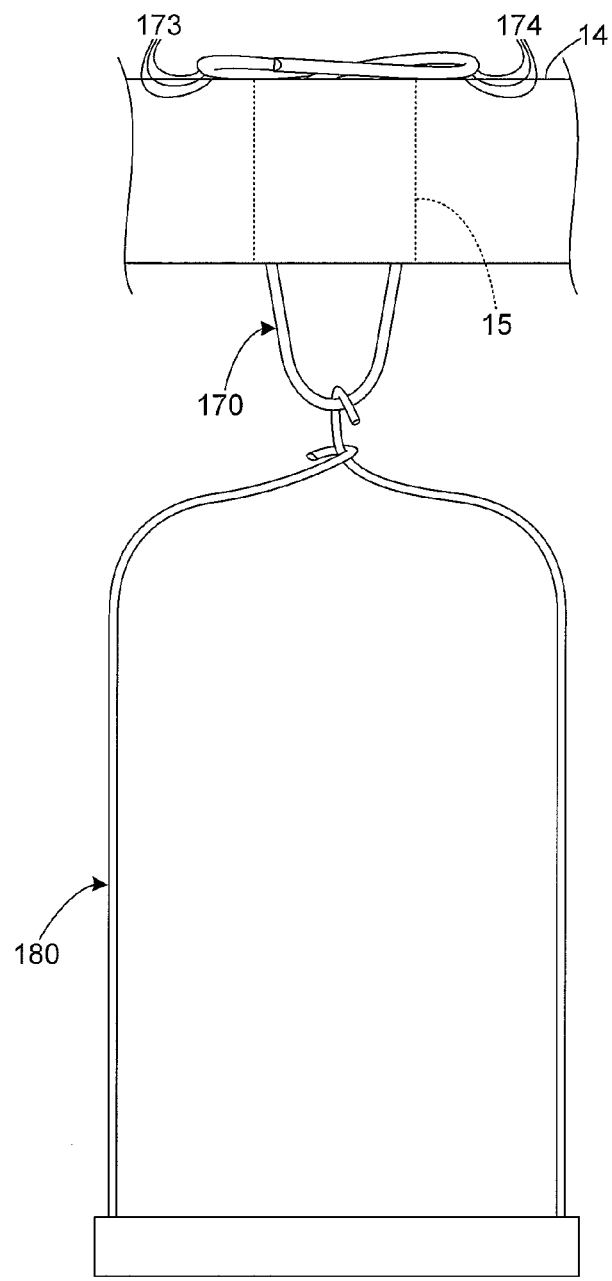
FIG. 5 is an enlarged, cross-sectional side view of the housing's bottom, tool, and attachment device (e.g. in the form of a bird swing), in accordance with a preferred embodiment of the present invention.

FIG. 5 is an enlarged, cross-sectional side view of a portion of the housing's bottom 14, tool 170, and attachment device 180 (e.g. in the form of a bird swing 180), in accordance with a preferred embodiment of the present invention.

The bird-operated interactive bird feeder 100 comprises the following elements and sub-elements:

- feed hopper 10 or housing 10
- lid 11
- feed hopper bottom 14 including aperture 15
- tool 70 (comprising first portion 71 and second portion 72), 170 (comprising first portion 173 and second portion 174)
- attachment device 80, 180 which may be, for example, safety pin 80, bird swing 180, or perch (not shown)
- attractant (e.g. seeds 84, leather piece 85, and/or worm 86)
- stage 30 (optional)
- foot blocks (optional, not shown) provided below stage
- gauge and adjusting device for the tool (optional, not shown)
- suspension handle (optional, not shown)
- stage prop step block(s) (optional, not shown) may be, for example, bird steps, etc.
- fasteners such as screws, nails, and/or glue (not shown)

This bird-operated interactive bird feeder 100 attracts birds such as songbirds and dispenses a limited amount of bird feed (e.g. seed) when a bird operates a tool 70, 170 to thereby dispense bird feed as per the present invention. Feed is held in storage in a feed hopper 10 (i.e. housing 10) above a stage 30. There is an aperture 15 in the bottom 14 of the feed hopper 10 large enough for the enclosed feed to flow freely from the hopper 10 to the stage 30. However, the aperture 15 in the bottom 14 of the feed hopper 10 is equipped with the tool 70, 170 that causes the feed to bridge. When a bird operates the tool 70, 170 as described below, the tool 70, 170 disrupts the bridged feed causing feed flow for a brief time, and then rebuilds the feed bridge shortly thereafter when the bird ceases operation of the tool 70, 170. During operation of the tool 70, 170 by the bird, the amount of feed that flows could be as little as one piece/unit of feed (e.g. one seed or worm) to preferably multiple pieces/units of feed (e.g. multiple seeds, worms or combination thereof).

Feed hopper 10. In one embodiment, the feed hopper 10 (i.e. housing 10) may be made up of preferably 4 wood boards fastened together by screws, nails and/or glue. Other fasteners may of course be contemplated. These boards are sufficiently rigid and are preferably at least 1" thick. The back of the hopper may be, for example, 5½" wide by 16" high. The front of the feed hopper may be, for example, 5½" wide by 7" high. The 2 sides may be, for example, 3½" wide by 6" high. The 2 sides are preferably fastened inboard of the front and back with the tops of the front, back, and both sides aligned. The resultant feed hopper has an interior cross section of, for example, 3½" by 3½" and outside dimensions of, for example, 5½" by 5½".

Lid 11. The lid may be, for example, 5½" by 5½" and is preferably made of at least 1" thick wooden board. Grooves are cut on two sides to seat an optional wire suspension handle. The edges on the top side of the lid may be tapered to shed rain water. Grooves may be cut into the underside of the lid (i.e. outboard of the hopper sides) to function as a drip edge. This keeps the stored feed dry. A preferably 3" by 3" block that is 1" thick is screwed and glued to the center of the underside of the lid. This block prevents the lid from sliding sideways off the feed hopper and also prevents warpage of the lid.

Feed hopper bottom 14. The feed hopper bottom 14 may be, for example, 5½" wide and 3½" front to back including an aperture 15 (e.g. a preferably 1" diameter round hole 15) preferably centered in the feed hopper bottom 14. However, it is to be understood that the aperture 15 may be any shape or size dependent on the type of feed and flow rate desired upon activation of the tool, and dependent on the type of tool utilized as well. It is the function of the feed hopper to preferably store seeds as bird feed suspended over the stage. The preferably 1" round hole is used for black oil sunflower seed which is a favorite food of many birds. If there were no tool utilized, the hopper would empty of most of the seed onto the stage when the hopper was filled with seed. Most of the seed would fall to the stage or ground. If the hole was small enough to cause the seed to bridge above the hole, the seed would remain in the hopper and the birds would not obtain the seed.

Tool 70, 170. This tool is operated by the birds (e.g. wild birds) that are attracted to the feeder. The tool may be fabricated from, for example, a 9" stainless steel 14 gauge wire. The exemplary fabrication of this tool in this embodiment may be started by bending the wire in the center 180 degrees with a ¼" radius in the bend. We now have a "U" shaped wire. We then make preferably 2 additional bends in the wire, i.e. one on each of the two legs of the "U". These two bends are both preferably 90 degree bends inboard to the "U" and opposite each other at preferably 1¾" from the apex of the "U" and holding the same plane of the "U". These last mentioned bends have a radius of preferably ¼". The last two bends in the wire are preferably 1¼ inch from the wire ends. These last two bends have a radius of preferably ¼". If the "U" is held at a vertical attitude the last two bends will lay on a horizontal plane and are both outboard to the "U". The finished bird-operated tool may preferably be a 9" stainless steel wire with five bends on substantially two different planes. The "U" of the tool is inserted down through the 1" round hole 15 in the feed hopper bottom 14 leaving preferably about ¾" hanging visibly over the feeder stage. This "U" portion is supported by the wire ends with their respective bends as these wire ends lay substantially in their horizontal plane on the inside bottom of the feed hopper. The wire ends are racked slightly to allow the tool to rock when a bird pulls on the suspended attractant that is placed under the tool. This tool is fabricated to have no flat surfaces (i.e. other than the co-linear portions mentioned below) so that the weight of the feed in the hopper will not prevent the tool from rocking. The rocking of the tool causes a disruption for a period of time (preferably less than a second) of a feed bridge but also causes the feed to re-bridge upon non-rocking of the tool. This controlled feed bridge disruption and then re-building of the feed bridge limits and controls the amount of feed fed to the birds. The tool therefore functions as a feed bridge disruption/feed re-bridging tool. FIG. 2 illustrates that while the tool 70 is positioned through the aperture 15, the tool 70 preferably does not touch the cylindrical wall surrounding the aperture 15. The tool 170 in FIG. 5 is similarly positioned through the aperture 15 in that the tool 170 preferably does not touch the cylindrical wall surrounding the aperture 15. In FIG. 5, the tool portion within the aperture 15 is not shown in phantom (i.e. as per tool 70 in FIG. 2) for simplicity purposes. It is noted that the shape of tool 170 in FIG. 5 within the aperture differs from that of tool 70 in FIG. 2. Dozens of different tools were tested during development of this tool. Flat surfaced tools and hooded tools failed in various tests. In one embodiment as shown in FIGS. 2-4, the tool 70 comprises a first portion 71 and second portion 72. These portions are preferably co-linear. Upon activation of the tool 70, the tool 70 moves via rolling motion of these co-linear portions along the bottom 14. In an alternative embodiment as per FIG. 5, the alternatively configured tool 170 comprises a first portion 173 and second portion 174. These portions are preferably curved.

Upon activation of the tool 170, the tool 170 moves via rocking motion of these curved portions along the bottom 14. Other tool configurations, material, dimensions, size, and/or shape that achieve feed bridging/disruption may of course be contemplated and are considered to be within the scope of the present invention. For example, the tool could be configured to function as a rocker arm or an inverse rocker arm.

Safety pin 80. A safety pin 80 may preferably be used to secure an attractant (e.g. seed(s) 84, leather piece 85, and/or worm 86) to the tool and essentially suspends the attractant under the tool. Alternative attachment devices may be utilized such as a smaller or larger gauge wire or fishing line. When the feeder is first placed, the attractant includes several seeds 84 as well as, for example, a piece of leather 85 preferably about the size, shape and color of the seeds. Some of the birds will learn that feed is dropped to the stage when they pull on the leather attractant. Other birds just wait for some other bird to operate the tool. Some feed is place on the stage manually during the bird training period. Many species of birds learn to operate the tool. Training of the birds may or may not be necessary. Alternative attachment devices other than safety pins may of course be contemplated and are considered to be within the scope of the present invention. Worm 86 may be, for example, a meal worm which is preferably of dried type. Bluebirds are seldom seen using bird feeders because bluebirds seldom eat seeds. They typically feed on meal worms or other small worms. When bluebirds are the target bird for the bird feeder, worms may be used as the sole type of feed contained within housing 10. Or, worms may be mixed with seed, dependent on the type of bird targeted for use of the bird feeder.

Stage 30. The stage was fabricated using a preferably 5½" by 12" board that may be, for example, 1" think. It forms a horizontal plane preferably 7" below the hopper bottom. It is centered and abuts the 16" back hopper board such that the stage extends preferably 3¼" past both the right and the left side of the feed hopper bottom. As the stage is in front of the back hopper board, it extends 1" past the front of the hopper. The stage provides a platform to catch small amounts of feed as the feed is released from the hopper. This small amount of feed is available to the birds. It is especially important that the stage make this food available to ground feeding birds such as cardinals. The stage optionally supports the stage prop step block(s). The underside of the stage optionally supports the gauge and adjusting device for the tool. The exposed corners and the edges of the stage may be rounded and trimmed. The stage 30 of the type shown in FIG. 1 may be optional meaning that the ground, floor, platform, or other stable surface that the feeder may be positioned on may alternatively function as the "stage".

Foot blocks (not shown). Foot blocks may optionally be utilized and may be made from, for example, 1" by 1" wood. The rear foot block may be, for example, 5½" long and may be fastened to the bottom inboard side of the 16" high back hopper board matching the back hopper board's 5½" width. This block supports the rear of the stage. The front foot block may be, for example, 12" long and is fastened to the front underside of the stage matching the stage's 12" width. The two foot blocks support the stage preferably about 1" above grade forming a 1" by 12" protected space under the stage for the gauge and adjusting device. This protected space may be also used for labeling.

Gauge and adjustment device (not shown) for the tool 70, 170. The gauge may be optionally utilized and may comprise two pins inserted into the underside of the bird feeder stage. The pins may be, for example, 1½" apart and ½" high. The tool may be adjusted by changing the spacing between the wires. A closer spacing is used for smaller feed (e.g. black oil sunflower seeds) and a larger spacing for larger feed (e.g. striped sunflower seeds). The spacing also determines the amount of feed the birds receive during a bridge disruption/re-bridging action when the bird operates the tool.

Suspension handle (not shown). The bird-operated feeder is designed to function either by suspension by a suspension handle, by standing on the foot blocks, or by placing on a level surface via neither the suspension handle nor the foot blocks. The wire preferably used to fabricate the suspension handle may be, for example, 14 gauge stainless steel wire or other bendable material. To secure the handle to the hopper, the wire is preferably threaded through small holes in the hopper sides. The ends of the wire are upset so the wire ends cannot pass back through the small holes. The wire suspension handle seats into the grooves (not shown) of the lid and then is bent into an apex above the feeder. The handle is strong enough to hold the hopper during use.

Stage prop step block(s) (not shown). Step block(s) may optionally be utilized and may be made of, for example, 3 wood pieces fastened together with fasteners such as screws, nails, and/or glue. The wood stock used may be, for example, 1½" by 1½" and in lengths of, for example, 1", 2" and 3". The blocks are arranged to form a set of three stairs. The step block(s) are placed on the stage under the tool. Birds may use the step block while examining and/or acting on the attractant to trigger the tool. There is also a bird swing, a bird perch, a ball on a string or other "stage props" that the birds may use to access or trigger the tool. Some birds such as cardinals are ground feeders and, as such, eat seeds off the ground (i.e. seldom from a bird feeder). Cardinals may learn that by using a swing or perch as described throughout this disclosure, feed will be dispensed from the housing onto the stage where the cardinals are more inclined to consume feed.

Fasteners. This bird-operated feeder is preferably constructed of wood and wire. Other suitable materials may of course be contemplated and are considered to be within the scope of the present invention. Screws, nails, and/or glue may preferably be used as fasteners. Other fasteners may of course be contemplated and are considered to be within the scope of the present invention.

The present invention is directed to a bird-operated interactive bird feeder 100 comprising a housing 10 that stores bird feed, wherein the housing 10 comprises a bottom 14, and wherein the bottom 14 includes an aperture 15. The bird feeder 100 also comprises a tool 70, 170, wherein at least a portion of the tool 70, 170 is positioned within the housing 10 and in the vicinity of the aperture 15 (and preferably is positioned above and adjacent to an area of the bottom 14 surrounding the aperture 15), wherein the tool 70, 170 is movable from a first position to a second position, and wherein the tool 70, 170 is capable of moving from the first position to the second position when a bird exerts a force on the tool 70, 170. The at least a portion of the tool 70, 170 bridges the feed thereby restricting the bird feed from passing through the aperture 15 when the tool 70, 170 is in the first position, and wherein the at least a portion of the tool 70, 170 disrupts the bridged feed thereby allowing the bird feed to pass through the aperture 15 when the tool 70, 170 is in the second position. If the bird continues to interact with the tool, the tool may then alternate between the first and second positions resulting in the respective feed bridging(s) and feed bridge disruption(s).

In one embodiment, the bird feeder 100 may further comprise an attachment device 80, 180 that is secured to the tool 70, 170, wherein the attachment device 80, 180 is at least partly exterior to the housing 10, and wherein the bird exerts an indirect force on the tool 70, 170 via the attachment device

80, 180. An attractant (e.g. seed(s) 84, leather piece 85, and/or worm 86) may be secured to the attachment device 80, 180 such that the bird interacts with the attractant thereby providing the indirect force on the tool 70, 170 via the attachment device 80, 180. The attachment device may be, for example, a safety pin 80, a bird swing 180, or a perch (not shown). The bird swing 180 or perch may or may not utilize an attractant since the bird's movement or typical use of these devices (e.g. merely swinging or the difference in applied weight when standing on versus flying off of the devices) would provide the indirect force necessary to be exerted on the tool 70, 170. Alternatively, more than one of the same or different types of attachment devices may be employed simultaneously. For example, a safety pin 80 and bird swing 180 may be simultaneously employed. Although the attachment device is shown in the drawings as being secured to the tool at a location exterior to the housing 10, the location of the securement may alternatively be within the housing 10 or even within the aperture 15 itself.

In an alternative embodiment, the tool 70, 170 may extend through the aperture 15 such that the tool 70, 170 is partly exterior to the housing 10. An attractant (e.g. seed(s) 84, leather piece 85, and/or worm 86) may be secured to the tool 70, 170 such that the bird interacts with the attractant thereby providing a direct force on the tool 70, 170. The tool 70, 170 may comprise, for example, a safety pin type latching mechanism, a bird swing, or a perch.

In another alternative embodiment, the attractant may be secured to the tool 70, 170 such that the bird interacts with the attractant thereby providing a direct force on the tool 70, 170, and wherein the attractant is at least partly exterior to the housing 10. For example, the tool 70, 170 may be positioned entirely within the housing 10 (or entirely within the housing 10 and aperture 15). In this configuration, an attractant such as a piece of leather 85 may be attached to the tool at a location within the housing (or within the aperture). The piece of leather 85 would preferably extend downwardly through the aperture to a location exterior to the housing 10 and therefore would be easily accessible to the birds.

In yet another alternative embodiment, an attachment device of the type mentioned above may be positioned entirely within the housing 10, entirely within the housing 10 and aperture 15, or entirely within the aperture 15.

The bird feed that is allowed to pass through the aperture 15 (i.e. via tool 70, 170) preferably comprises more than one piece of bird feed during each feed disruption period, although one piece of bird feed dispensed during each feed disruption period may also be contemplated. The shape, size, and weight of the feed, the shape and size of the aperture 15, and the configuration, material, dimensions, size, and/or shape of the tool are all design variables which affect the amount, flow rate, and duration of the feed bridging/disruption that is desired and are considered to be within the scope of the present invention.

Throughout the above description, feed and seed may be used interchangeably. Other types of feed other than seed may be employed with the present invention, with worms being another example. Also, the material, dimensions, size and shape of the housing may differ than that described in the exemplary embodiments above. Such difference are considered to be within the scope of the present invention.

The contemplated modifications and variations specifically mentioned above and below are considered to be within the spirit and scope of the present invention.

Those of ordinary skill in the art will recognize that various modifications and variations may be made to the embodiments described above without departing from the spirit and scope of the present invention. For example, although the tool 70, 170 is described above as comprising two portions which roll/rock along the bottom 14, other configurations having any number of rolling/rocking portion(s) (or even other movement types other than rolling or rocking such as sliding) may be contemplated in accordance with the present invention. It is therefore to be understood that the present invention is not limited to the particular embodiments disclosed above, but it is intended to cover such modifications and variations as defined by the following claims.

What is claimed is:

1. A bird-operated interactive bird feeder comprising:
   a housing that stores bird feed, wherein the housing comprises a bottom, and wherein the bottom includes an aperture; and
   a tool comprising two co-linear portions, wherein at least a portion of the tool is positioned within the housing and in the vicinity of the aperture, wherein the tool is movable from a first position to a second position via rolling motion of the two co-linear portions along the bottom, and wherein the tool is capable of moving from the first position to the second position when a bird exerts a force on the tool;
   wherein the at least a portion of the tool bridges the feed thereby restricting the bird feed from passing through the aperture when the tool is in the first position, and wherein the at least a portion of the tool disrupts the bridged feed thereby allowing the bird feed to pass through the aperture when the tool is in the second position.

2. The bird feeder of claim 1 further comprising an attachment device that is secured to the tool, wherein the attachment device is at least partly exterior to the housing, wherein the force is an indirect force, and wherein the bird exerts the indirect force on the tool via the attachment device.

3. The bird feeder of claim 2, wherein the attachment device is capable of securing an attractant such that the bird interacts with the attractant thereby providing the indirect force on the tool via the attachment device.

4. The bird feeder of claim 3, wherein the attractant is a seed, a piece of leather, or a worm.

5. The bird feeder of claim 2, wherein the attachment device is a bird swing or perch.

6. The bird feeder of claim 1, wherein the tool extends through the aperture such that the tool is partly exterior to the housing, wherein the force is a direct force, and wherein the bird exerts the direct force on the tool.

7. The bird feeder of claim 6, wherein the tool is capable of securing an attractant such that the bird interacts with the attractant thereby providing the direct force on the tool.

8. The bird feeder of claim 7, wherein the tool comprises a safety pin type latching mechanism.

9. The bird feeder of claim 7, wherein the attractant is a seed, a piece of leather, or a worm.

10. The bird feeder of claim 6, wherein the tool further comprises a bird swing or perch.

11. A bird-operated interactive bird feeder comprising:
    a housing that stores bird feed, wherein the housing comprises a bottom, and wherein the bottom includes an aperture; and
    a tool comprising two curved portions, wherein at least a portion of the tool is positioned within the housing and in the vicinity of the aperture, wherein the tool is movable from a first position to a second position via rocking motion of the two curved portions along the bottom, and wherein the tool is capable of moving from the first position to the second position when a bird exerts a force on the tool;

wherein the at least a portion of the tool bridges the feed thereby restricting the bird feed from passing through the aperture when the tool is in the first position, and wherein the at least a portion of the tool disrupts the bridged feed thereby allowing the bird feed to pass through the aperture when the tool is in the second position.

12. The bird feeder of claim 11 further comprising an attachment device that is secured to the tool, wherein the attachment device is at least partly exterior to the housing, wherein the force is an indirect force, and wherein the bird exerts the indirect force on the tool via the attachment device.

13. The bird feeder of claim 12, wherein the attachment device is capable of securing an attractant such that the bird interacts with the attractant thereby providing the indirect force on the tool via the attachment device.

14. The bird feeder of claim 12, wherein the attachment device is a bird swing or perch.

15. The bird feeder of claim 11, wherein the tool extends through the aperture such that the tool is partly exterior to the housing, wherein the force is a direct force, and wherein the bird exerts the direct force on the tool.

16. The bird feeder of claim 15, wherein the tool is capable of securing an attractant such that the bird interacts with the attractant thereby providing the direct force on the tool.

17. The bird feeder of claim 15, wherein the tool further comprises a bird swing or perch.

18. A bird-operated interactive bird feeder comprising:

a housing that stores bird feed, wherein the housing comprises a bottom, and wherein the bottom includes an aperture;

a tool, wherein at least a portion of the tool is positioned within the housing and in the vicinity of the aperture, wherein the tool is movable from a first position to a second position, and wherein the tool is capable of moving from the first position to the second position when a bird exerts an indirect force on the tool; and an attachment device that is secured to the tool, wherein the attachment device is at least partly exterior to the housing, wherein the bird exerts the indirect force on the tool via the attachment device, wherein an attractant is secured to the attachment device such that the bird interacts with the attractant thereby providing the indirect force on the tool via the attachment device, and wherein the attachment device is a safety pin;

wherein the at least a portion of the tool bridges the feed thereby restricting the bird feed from passing through the aperture when the tool is in the first position, and wherein the at least a portion of the tool disrupts the bridged feed thereby allowing the bird feed to pass through the aperture when the tool is in the second position.

19. The bird feeder of claim 1, wherein the bird feed that is allowed to pass through the aperture comprises more than one piece of bird feed.

20. The bird feeder of claim 1, wherein the at least a portion of the tool is positioned above and adjacent to an area of the bottom surrounding the aperture.

21. The bird feeder of claim 1, wherein the bird feeder is a songbird-operated interactive bird feeder.

22. The bird feeder of claim 1, wherein the at least a portion of the tool is positioned above and in contact with an area of the bottom surrounding the aperture.

* * * * *